(12) United States Patent
Hu et al.

(10) Patent No.: US 11,959,043 B2
(45) Date of Patent: Apr. 16, 2024

(54) METHOD FOR EXTRACTING PLANT ESSENTIAL OIL WITH DUAL AUXILIARIES

(71) Applicant: SHANGHAI INSTITUTE OF TECHNOLOGY, Shanghai (CN)

(72) Inventors: Jing Hu, Shanghai (CN); Weijun Deng, Shanghai (CN); Fucheng Wei, Shanghai (CN)

(73) Assignee: SHANGHAI INSTITUTE OF TECHNOLOGY, Shanghai (CN)

( * ) Notice: Subject to any disclaimer, the term of this patent is extended or adjusted under 35 U.S.C. 154(b) by 0 days.

(21) Appl. No.: 17/573,176

(22) Filed: Jan. 11, 2022

(65) Prior Publication Data
US 2022/0220413 A1     Jul. 14, 2022

(30) Foreign Application Priority Data
Jan. 11, 2021 (CN) .......................... 202110030084.3

(51) Int. Cl.
*B01D 3/40* (2006.01)
*C11B 9/00* (2006.01)
*C11B 9/02* (2006.01)

(52) U.S. Cl.
CPC ................ *C11B 9/027* (2013.01); *B01D 3/40* (2013.01); *C11B 9/0007* (2013.01); *C11B 9/025* (2013.01)

(58) Field of Classification Search
CPC ....... C11B 9/0007; C11B 9/025; C11B 9/027; B01D 3/40
See application file for complete search history.

(56) References Cited

U.S. PATENT DOCUMENTS

| 9,926,513 B2 * | 3/2018 | Wasserman | .......... B01D 11/028 |
| 2019/0099736 A1 * | 4/2019 | Sibal | .................... B01D 17/047 |

FOREIGN PATENT DOCUMENTS

| CN | 109609271 A | * | 4/2019 | ............. C11B 9/025 |
| CN | 109652209 A | * | 4/2019 | ............. C11B 9/025 |
| CN | 111718799 A | * | 9/2020 | ............. C11B 9/025 |
| FR | 3034626 A1 | * | 10/2016 | ........... A23L 33/105 |

OTHER PUBLICATIONS

Machine Translation of CN 109609271 A Obtained from PE2E Search on Feb. 15, 2023. (Year: 2023).*
Espacenet Machine Translation of FR 3034626 Obtained Jul. 13, 2023 (Year: 2023).*

* cited by examiner

*Primary Examiner* — Jonathan Miller
(74) *Attorney, Agent, or Firm* — Brooks Kushman P.C.

(57) ABSTRACT

The present disclosure discloses a method for extracting a plant essential oil with dual auxiliaries, which includes: using an aromatic plant as a raw material, adding an extracting liquid prepared from the dual auxiliaries and water, stirring evenly for raw material wetting back, then distilling and collecting the essential oil, where the dual auxiliaries include a component A and a component B, the component A includes at least one of choline chloride and betaine, and the component B includes at least one of a natural acid, an amine, an alcohol and a saccharide.

7 Claims, No Drawings

METHOD FOR EXTRACTING PLANT ESSENTIAL OIL WITH DUAL AUXILIARIES

CROSS REFERENCE TO RELATED APPLICATION

This patent application claims the benefit and priority of Chinese Patent Application No. 202110030084.3 filed on Jan. 11, 2021, the disclosure of which is incorporated by reference herein in its entirety as part of the present application.

TECHNICAL FIELD

The present disclosure relates to a method for improving extraction efficiency of essential oil by using dual auxiliaries combined with a conventional essential oil extraction method, and belongs to the technical field of chemical extraction.

BACKGROUND

Essential oil is a volatile and odorous oil which widely exists in oily glands of various aromatic plants and presents as fraction isolated by processing and extracting from plants with characteristic aromatic attributes. Essential oil not only brings a pleasant olfactory sensing, but also has a variety of biological activities, widely used in fields such as food, cosmetic and textile. The methods for extracting essential oils usually include the hydrodistillation, and the methods based on it, such as the enzyme-assisted distillation, the ultrasonic-assisted distillation, the microwave-assisted distillation and the ohm-assisted heating distillation. The fundamental goal of the extracting method development is to improve the extraction rate and quality of essential oils.

A deep eutectic solvent is a novel solvent prepared by mixing and heating a hydrogen bond donor (HBD) and a hydrogen bond acceptor (HBA). A deep eutectic solvent is characterized with a relatively strong intermolecular force with raw materials for extraction, which improves the extraction efficiency. Literature reveals that its melting point is significantly lower than that of any of its components. Reports with the deep eutectic solvents (J. Agric. Food Chem. 2017, 65, 3591-3601; J. Nat. Prod. 2018, 81, 679-690; ACS Sustainable Chem. Eng. 2020, 8, 10591-10612) have disclosed works of the preparation and their use in extraction, wherein the preparation of the deep eutectic solvents is a precondition of the extraction. Patent CN111171095A discloses a deep eutectic solvent consisting of choline chloride and any one selected from the group consisting of 1,3-propanediol, levulinic acid, glycolic acid and DL-lactic acid in a molar ratio of 1:1-3, which is used to extract flavonoids from *Premna fulva* Craib. CN111116443A discloses that a hydrogen bond acceptor (such as choline chloride and DL-menthol) and a hydrogen bond donor (such as tartaric acid, lactic acid and gluconic acid) are mixed in a certain proportion at a temperature of 80-90° C. to prepare a natural deep eutectic solvent, which is used to extract carotenoid. The preparation of the deep eutectic solvents is the step before extraction process.

Furthermore, the deep eutectic solvent is usually mixed with/without a small amount of water for the preparation before extraction process. The dosage of the deep eutectic solvent is usually relatively large, which limits its application in essential oil extraction from economic evaluation.

SUMMARY

A technical problem to be solved in the present disclosure is that, when a deep eutectic solvent is used for extraction, the dosage of the deep eutectic solvent is relatively large and the deep eutectic solvent needs to be prepared in advance.

In order to solve the above technical problem, the present disclosure provides a method for extracting a plant essential oil with dual auxiliaries, comprising: using an aromatic plant as a raw material, adding an extracting liquid prepared from the dual auxiliaries for extraction and water and stirring evenly for wetting back, then distilling and collecting the essential oil; wherein the dual auxiliaries comprise a component A and a component B, the component A comprises at least one of choline chloride and betaine, and the component B comprises at least one of a natural acid, an amine, an alcohol and a saccharide.

In some embodiments, the natural acid is at least one selected from the group consisting of citric acid, malic acid, tartaric acid, malonic acid, mucic acid and amino acid; the amine is at least one selected from the group consisting of urea and methylurea; the alcohol is at least one selected from the group consisting of ethylene glycol, 1,4-butanediol, sorbitol and glycerol, and the saccharide is at least one selected from the group consisting of a monosaccharide, a disaccharide and a polysaccharide.

In some embodiments, the monosaccharide is at least one selected from the group consisting of maltose and sorbose.

In some embodiments, a mass ratio of the component A to the component B is in a range of 1:(0.1-10).

In some embodiments, a mass ratio of the component A to the component B is in a range of 1:(0.5-5).

In some embodiments, the aromatic plant is used in any one or more of its flowers, leaves, stems and roots.

In some embodiments, raw materials of the dual auxiliaries are added into deionized water together or in steps, and stirred evenly to prepare the extracting liquid.

In some embodiments, a mass ratio of the dual auxiliaries to the extracting liquid is in a range of (0.1-1000):100.

In some embodiments, the distillation is performed by enzyme-assisted distillation, ultrasonic-assisted distillation or ohm-assisted heating-lamp distillation, supercritical carbon dioxide extraction or subcritical water extraction.

In the present disclosure, the preparation with a deep eutectic solvent is avoided, and instead a material A and a material B are each put into a water phase directly to form an extracting liquid containing the dual auxiliaries, which simplifies the processes and improves the extraction efficiency.

Compared with the prior art, the present disclosure uses the green and environment-friendly dual auxiliaries combined with a conventional distillation technology, which not only is simple in operation and low in cost, but also improves the quality and the extraction efficiency of essential oils.

DETAILED DESCRIPTION

In order to make the present disclosure more apparent, the preferred embodiments of the present disclosure are described in detail as follows.

In the context of the present disclosure, the term "dual auxiliaries" may be referred to as "dual extracting auxiliaries", which are equivalent in meaning. In the present disclosure, the extracting liquid prepared from the dual auxiliaries for extraction may be achieved by diluting dual extracting auxiliaries with water. In the present disclosure, the material A and the material B may be put into the water phase together or stepwisely to form the extracting liquid containing the dual auxiliaries. In the present disclosure, the distillation may be performed by hydrodistillation.

Example 1

A formulation of dual auxiliaries (A+B) for essential oil extraction is shown in Table 1.

TABLE 1

| A | B | A:B (mass ratio) |
|---|---|---|
| Betaine | Citric acid | 1:(0.5-5) |
|  | Malic acid | 1:(0.5-5) |
|  | Tartaric acid | 1:(0.5-5) |
|  | Malonic acid | 1:(0.5-5) |
|  | Urea | 1:(0.5-5) |
|  | Methylurea | 1:(0.5-5) |
|  | Ethylene Glycol | 1:(0.5-5) |
|  | 1,4-butanediol | 1:(0.5-5) |
|  | Mucic acid | 1:(0.5-5) |
|  | Proline | 1:(0.5-5) |
|  | Sorbitol | 1:(0.5-5) |
|  | Maltodextrin | 1:(0.5-5) |
| Choline chloride | Citric acid | 1:(0.5-5) |
|  | Malic acid | 1:(0.5-5) |
|  | Tartaric acid | 1:(0.5-5) |
|  | Malonic acid | 1:(0.5-5) |
|  | Urea | 1:(0.5-5) |
|  | Methylurea | 1:(0.5-5) |
|  | Ethylene Glycol | 1:(0.5-5) |
|  | 1,4-butanediol | 1:(0.5-5) |
|  | Mucic acid | 1:(0.5-5) |
|  | Proline | 1:(0.5-5) |
|  | Sorbitol | 1:(0.5-5) |
|  | Maltodextrin | 1:(0.5-5) |

Example 2

A method for extracting a plant essential oil (taking Dill seed as an example) was performed by the following steps:
(1) 100 g of Dill seed was taken, crushed with a blender, and added into a 2 L flask.
(2) 33.3 g of betaine and 66.6 g of malic acid were taken and mixed in a beaker.
(3) 500 g of deionized water was added into the beaker and stirred evenly, obtaining an extracting liquid.
(4) The resultant extracting liquid containing the dual auxiliaries was poured into the flask containing 100 g of the crushed Dill seed and subjected to an ultrasonic treatment.
(5) The ultrasonic treated mixture was distilled for 3 hours and a Dill seed essential oil was obtained.

Example 3

A method for extracting a plant essential oil (taking Dill seed as an example) was performed by the following steps:
(1) 100 g of Dill seed was taken, crushed with a blender, and added into a 2 L flask.
(2) 66.6 g of betaine and 33.3 g of citric acid were taken and mixed in a beaker.
(3) 500 g of deionized water was added into the beaker and stirred evenly.
(4) 100 g of the crushed Dill seed was added into the beaker and subjected to an ultrasonic treatment.
(5) The ultrasonic treated mixture was distilled for 3 hours and a Dill seed essential oil was obtained.

Example 4

A method for extracting a plant essential oil (taking Dill seed as an example) was performed by the following steps:
(1) 100 g of Dill seed was taken, crushed with a blender, and added into a 2 L flask.
(2) 16.6 g of betaine and 83.4 g of citric acid were taken and mixed in a beaker.
(3) 500 g of deionized water was added into the beaker and stirred evenly.
(4) 100 g of the crushed Dill seed was added into the beaker and subjected to an ultrasonic treatment.
(5) The ultrasonic treated mixture was distilled for 3 hours and a Dill seed essential oil was obtained.

Example 5

A method for extracting a plant essential oil (taking Dill seed as an example) was performed by the following steps:
(1) 100 g of Dill seed was taken, crushed with a blender, and added into a 2 L flask.
(2) 0.83 g of betaine and 4.17 g of citric acid were taken and mixed in a beaker.
(3) 500 g of deionized water was added into the beaker and stirred evenly.
(4) 100 g of the crushed Dill seed was added into the beaker and subjected to an ultrasonic treatment.
(5) The ultrasonic treated mixture was distilled for 3 hours and a Dill seed essential oil was obtained.

Example 6

A method for extracting a plant essential oil (taking Dill seed as an example) was performed by the following steps:
(1) 100 g of Dill seed was taken, crushed with a blender, and added into a 2 L flask.
(2) 33.3 g of betaine and 66.6 g of tartaric acid were taken and mixed in a beaker.
(3) 500 g of deionized water was added into the beaker and stirred evenly, obtaining an extracting liquid.
(4) The resultant extracting liquid containing the dual auxiliaries was poured into the flask containing 100 g of the crushed Dill seed and subjected to an ultrasonic treatment.
(5) The ultrasonic treated mixture was distilled for 3 hours and a Dill seed essential oil was obtained.

Example 7

A method for extracting a plant essential oil (taking *Fructus foeniculi* as an example) was performed by the following steps:
(1) 100 g of *Fructus foeniculi* was taken, crushed with a blender, and added into a 2 L flask.
(2) 33.3 g of betaine and 66.6 g of citric acid were taken and mixed in a beaker.
(3) 500 g of deionized water was added into the beaker and stirred evenly, obtaining an extracting liquid.
(4) The resultant extracting liquid containing the dual auxiliaries was poured into the flask containing 100 g of the crushed *Fructus foeniculi* and subjected to an ultrasonic treatment.
(5) The ultrasonic treated mixture was distilled for 3 hours and a *Fructus foeniculi* essential oil was obtained.

Example 8

A method for extracting a plant essential oil (taking Chinese Eaglewood as an example) was performed by the following steps:

(1) 100 g of Chinese Eaglewood was taken, crushed with a blender, and added into a 2 L flask.
(2) 33.3 g of betaine and 66.6 g of citric acid were taken and mixed in a beaker.
(3) 500 g of deionized water was added into the beaker and stirred evenly, obtaining an extracting liquid.
(4) The resultant extracting liquid containing the dual auxiliaries was poured into the flask containing 100 g of the crushed Chinese Eaglewood and subjected to an ultrasonic treatment.
(5) The ultrasonic treated mixture was distilled for 3 hours and a Chinese Eaglewood essential oil was obtained.

Example 9

A method for extracting a plant essential oil (taking dwarf *Fructus foeniculi* as an example) was performed by the following steps:
(1) 100 g of dwarf *Fructus foeniculi* was taken, crushed with a blender, and added into a 2 L flask.
(2) 33.3 g of choline chloride and 66.6 g of citric acid were taken and mixed in a beaker.
(3) 500 g of deionized water was added into the beaker and stirred evenly, obtaining an extracting liquid.
(4) The resultant extracting liquid containing the dual auxiliaries was poured into the flask containing 100 g of the crushed *Fructus foeniculi* and subjected to an ultrasonic treatment.
(5) The ultrasonic treated mixture was distilled for 3 hours and a *Fructus foeniculi* essential oil was obtained.

Example 10

A method for extracting a plant essential oil (taking dwarf *Fructus foeniculi* as an example) was performed by the following steps:
(1) 100 g of dwarf *Fructus foeniculi* was taken, crushed with a blender, and added into a 2 L flask.
(2) 20 g of choline chloride and 80 g of urea were taken and mixed in a beaker.
(3) 500 g of deionized water was added into the beaker and was stirred evenly, obtaining an extracting liquid.
(4) The resultant extracting liquid containing the dual auxiliaries was poured into the flask containing 100 g of the crushed *Fructus foeniculi* and subjected to an ultrasonic treatment.
(5) The ultrasonic treated mixture was distilled for 3 hours and a *Fructus foeniculi* essential oil was obtained.

Example 11

A method for extracting a plant essential oil (taking dwarf *Fructus foeniculi* as an example) was performed by the following steps:
(1) 100 g of dwarf *Fructus foeniculi* was taken, crushed with a blender, and added into a 2 L flask.
(2) 9.1 g of choline chloride and 90.9 g of sorbitol were taken and mixed in a beaker.
(3) 500 g of deionized water was added into the beaker and stirred evenly, obtaining an extracting liquid.
(4) The resultant extracting liquid containing the dual auxiliaries was poured into the flask containing 100 g of the crushed *Fructus foeniculi* and subjected to an ultrasonic treatment.
(5) The ultrasonic treated mixture was distilled for 3 hours and a *Fructus foeniculi* essential oil was obtained.

Example 12

A method for extracting a plant essential oil (taking dwarf *Fructus foeniculi* as an example) was performed by the following steps:
(1) 100 g of *Fructus foeniculi* was taken, crushed with a blender, and added into a 2 L flask.
(2) 0.5 g of choline chloride and 4.5 g of maltodextrin were taken and mixed in a beaker.
(3) 500 g of deionized water was added into the beaker and stirred evenly, obtaining an extracting liquid.
(4) The resultant extracting liquid containing the dual auxiliaries was poured into the flask containing 100 g of the crushed *Fructus foeniculi* and subjected to an ultrasonic treatment.
(5) The ultrasonic treated mixture was distilled for 3 hours and a *Fructus foeniculi* essential oil was obtained.

Example 13

A method for extracting a plant essential oil (taking dwarf *Fructus foeniculi* as an example) was performed by the following steps:
(1) Water was sprayed to dried raw material-dwarf *Fructus foeniculi* (a weight of water sprayed was 5-50% of the weight of dried dwarf *Fructus foeniculi*), crushed with a blender, and 100 grams of the crushed raw material were weighed and put into a 2 L flask.
(2) 0.91 g of choline chloride and 9.09 g of maltodextrin were taken and mixed in a beaker.
(3) 500 g of deionized water was added into the beaker and stirred evenly, obtaining an extracting liquid.
(4) The resultant extracting liquid containing the dual auxiliaries was poured into the flask containing 100 g of crushed *Fructus foeniculi* and subjected to an ultrasonic treatment.
(5) The ultrasonic treated mixture was distilled for 3 hours and a *Fructus foeniculi* essential oil was obtained.

Example 14

30 g of *Fructus foeniculi* without crushing treatment and 5 g of the dual auxiliaries were added into 100 g of deionized water and distillation was performance as mentioned above.
The extraction rate of *Fructus foeniculi* essential oil was as shown in Table 2.

TABLE 2

| Distillation with water | With Choline chloride (A) + Citric acid (B) in amass ratio of 1:2 | With Betaine (A) + Citric acid (B) in a mass ratio of 1:2 |
| --- | --- | --- |
| 1.6 ± 0.2% | 2.7 ± 0.15% | 2.68 ± 0.17% |

In Table 2, the "Choline chloride (A)+Citric acid (B)" were performed by distillation in water, and the "Choline Chloride (A)+Citric acid (B)" were performed by distillation in water.

What is claimed is:
1. A method for extracting a plant essential oil with dual auxiliaries, comprising:
providing an aromatic plant as a raw material, stirring into an extracting liquid for wetting, then distilling and collecting the essential oil;
wherein the extracting liquid is prepared from water and dual auxiliaries; and the dual auxiliaries comprise a component A and a component B, the component A is betaine, and the component B comprises at least one compound of an amine and a saccharide; wherein the amine is at least one compound selected from the group consisting of urea and methylurea; and the saccharide is at least one compound selected from the group consisting of maltose and maltodextrin.

2. The method of claim 1, wherein a mass ratio of the component A to the component B is in a range of 1:(0.1-10).

3. The method of claim 2, wherein a mass ratio of the component A to the component B is in a range of 1:(0.5-5).

4. The method of claim 1, wherein the aromatic plant is provided in a form selected from the group consisting of flowers, leaves, stems and roots.

5. The method of claim 1, wherein the dual auxiliaries are added into deionized water together or in steps, and stirred to prepare the extracting liquid.

6. The method of claim 1, wherein a mass ratio of the dual auxiliaries to the extracting liquid is in a range of (0.1-20):100.

7. The method of claim 1, wherein the distillation is performed by enzyme-assisted distillation, ultrasonic-assisted distillation or ohm-assisted heating-lamp distillation; and wherein the extraction is performed by supercritical carbon dioxide extraction or subcritical water extraction.

\* \* \* \* \*